Oct. 6, 1953   C. F. SPRAGUE   2,654,625
BAIL FOR CONTAINERS
Filed Sept. 29, 1951

INVENTOR.
CARL F. SPRAGUE
BY
Robert A. Sturges
ATTORNEY.

Patented Oct. 6, 1953

2,654,625

UNITED STATES PATENT OFFICE 2,654,625

BAIL FOR CONTAINERS

Carl F. Sprague, Lyndhurst, Ohio, assignor to The Sherwin-Williams Company, Cleveland, Ohio, a corporation of Ohio Application September 29, 1951, Serial No. 249,001

12 Claims. (Cl. 294—33)

This invention relates, as indicated, to a novel and useful clamping means for wire articles, and particularly for wire articles used on containers commonly used for containing liquids having lids usually referred to in the trade as friction-retained lids. More particularly, this invention relates to a wire bail for such containers which is adapted to be clamped on the rim of said container while at the same time remaining free to rotate through an arc.

Restrictions have been imposed, from time to time, on the use of tin plate in the manufacture of tin cans. When such restrictions are in force, it may be required that top rings, lids and bottoms of tin cans be made of black plate. Under certain circumstances, the restrictions may be such as to require that even the body be constructed of black plate. Normally, bail ears of the conventional type are made from scraps from the coatings of tops and bottoms. Thus, after the tin plate scrap supply has been exhausted, only black plate ears will be available.

Black plate is difficult, if not impossible, to solder under certain circumstances. It has, therefore, become desirable to provide a bail for such containers which is adaptable to use on "multiple friction lids" and which do not require solder. Since the ordinary bail attached to such liquid containers is attached to the can whether the lid is in place or not, it has also become desirable to construct such a bail that is useful with the lid in place or removed.

It is a principal object of this invention to provide a new and useful clamping means for use in connection with retaining formed wire articles, e. g., bails, lid retainers, etc., on the top of friction-retained lid type containers, such as, metal or fiber containers having friction-retained lids of the single friction or multiple friction types.

Another object of this invention is to provide a detachable bail for containers of the "multiple friction lid" type which bail is adapted to move through an arc across the top of the container.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

In general, this invention comprises the provision of a new clamping means for securing formed wire articles to a friction-retained lid type container wherein the lid is provided with an annular recessed portion, which clamping means comprises a recess engaging member, a rim traversing member and a chime engaging member formed from a continuous wire, each of said members constituting a loop of wire lying in a substantially vertical plane substantially at right angles to the plane of the next succeeding wire loop, and having a free end adapted to engage the chime of a friction-retained lid container, the depth of the recess engaging member being limited by the depth of the recess in the lid of said container, the width of the rim traversing member being no less than the width of the rim, the width of the chime engaging member ranging from about the width of the recess engaging member to about ½ the width of the recess engaging member, and having the free end of said chime engaging member of sufficient length to be positioned directly under the chime when the recess engaging member is in contact with the bottom of the recess in said container lid and, from the combined effect with the recess engaging member, in frictional engagement with the container body.

More particularly, this invention comprises the provision of a detachable wire bail for use on containers of the "multiple friction lid" type which bail comprises a handle portion terminating in at least one clamping means adapted to engage the can body under the top chime thereof, said clamping end being shaped to permit rotation of said bail through an arc across the top of said container.

Figure 1:
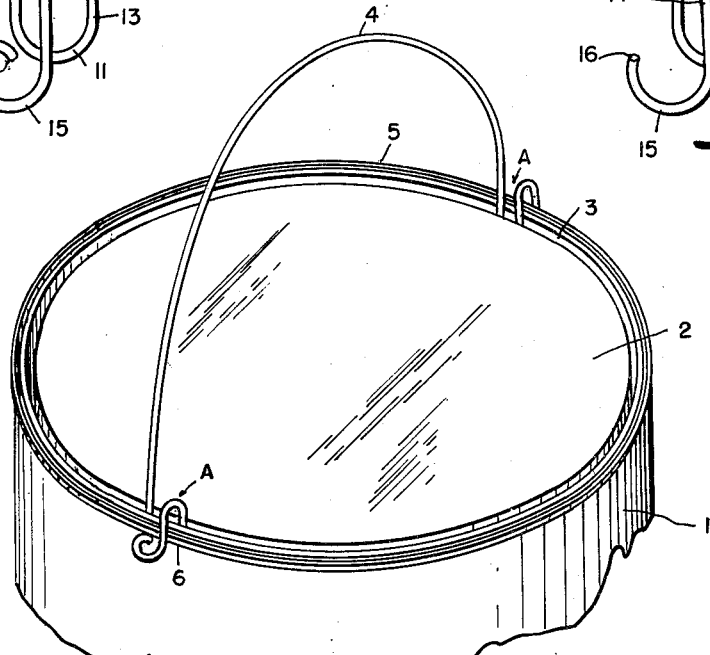
Fig. 1 is an isometric view of a top portion of an ordinary "double tight" container with a detachable bail of this invention shown in place.

Referring now with greater particularity to Fig. 1, there is shown an isometric view of a top portion 1 of an ordinary 1 gallon "double tight" tin can fitted with a lid 2 in place, said lid being provided with a groove 3 adapted to engage a correspondingly shaped member in the rim of the can, not shown. This is the standard "double tight" structure well known in the can making art. A handle or bail 4 is shown in place in Fig. 1.

The bail 4 is provided with end members or clamping means A which are adapted to engage the groove or recess 3, bridge the outer rim 5 and lock over the chime or bead 6, thereby securing the bail to the container. Since there is a groove or recess in the rim of the can, not shown, substantially corresponding to the groove 3 in the lid 2, it is clear that the bail may be attached in a similar manner, hereinafter more fully explained, after the lid 2 has been removed. The identically shaped ends A are preferably not oppositely formed. In other words, the bail ends of this invention, to borrow language from the chemical art, must have a "cis" configuration; if the bail is to be free to rotate in an arc across the top of the container; "cis" meaning that the free ends of the wire are on the same side of the plane of the handle portion. Thus, for convenience, corresponding parts of these ends A will be identically numbered in the respective figures to provide ready reference to such parts regardless of the figure under consideration.

Figure 2:
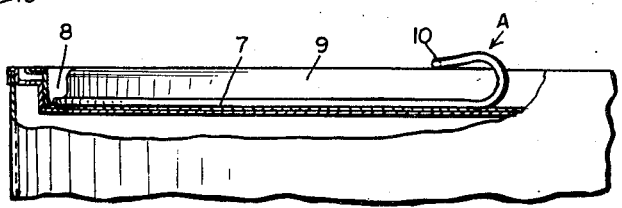
Fig. 2 is a fragmentary side view of an ordinary double tight container showing in a cutaway section a bail of this invention in the down position.

Fig. 2 is a fragmentary view of a top portion of the ordinary "double tight" container having a cut-away section permitting a view of a bail 7 in accordance with this invention in the down position within a groove 8 of a lid 9. The position of the end A of the bail 7 when the bail is down is shown in this figure. It should be pointed out that the end A has been cut at the point 10 in making the cut-away section so that only a portion of the end A is shown.

Figure 3:
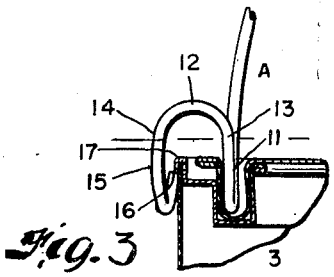
Fig. 3 is a fragmentary cut-away view showing the detail of a clamping end of a bail in accordance with this invention.

Fig. 3 is a view of an end A of a bail of this invention. It is convenient to consider the ends A as comprising essentially three arcs of substantially semi-circular shape, or loops which may be other than semi-circular in configuration These three primary arcs or loops all reside in substantially vertical planes which are, generally speaking, at right angles to the plane of the next succeeding arc. The first of these arcs will be referred to hereinafter as the groove engaging arc, the second as the rim traversing arc, and the third as the chime engaging or pivot arc. In Fig. 3 a groove engaging arc 11 is partially shown. This arc 11 becomes a rim traversing arc 12 at about the point 13. At the point 14 the rim traversing arc 12 becomes a chime engaging arc 15 having its free end 16 adapted to engage the chime 17. While the arcs 11 and 12 are, in the preferred cases, within planes which are at right angles to each other, it should be noted that the plane of the arc 15 is preferably somewhat removed from a right angle both on the horizontal and the vertical axis to permit positioning of the free end 16 under the chime 17 under sufficient tension to prevent the point 16 from readily slipping out from under the chime 17. The departure of the plane of the arc 15 from a right angle to the plane of the arc 12 on a vertical axis may range from 5° to about 45°. In other words, the departure of 5° to about 45° is acquired by rotating the plane of the arc 15 on a vertical axis inwardly, i. e., toward the groove engaging arc, through an angle of 5° to about 45°. The departure of the plane of the arc 15 from the perpendicular is in general that which is sufficient to supply an inwardly directed force at the point 16 when the bail is in the attached position. In this case the plane of the arc 15 is rotated about a horizontal axis in a direction of rotation away from the groove engaging arc. This may range in practice from about 1° to about 10° deviation from the perpendicular as viewed in Fig. 3. In like manner the arc or loop of the rim traversing arc may be tipped from the normal in either direction, toward or away from the free end of the chime engaging loop, from about 1° to as much as 10° to permit more or less of an arcuate path to be described by the handle portion.

Figure 4:
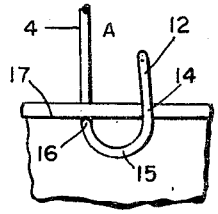
Fig. 4 is a fragmentary view of the outside of an ordinary paint can showing the position of a free end of a clamping means of a bail in accordance with this invention when said bail is in the up position.

In Fig. 4 is shown an end A viewed from the outside of the can on a plane coinciding with the top of the can. The continuation of the handle portion 4 dips down into the groove of the lid, not shown, and re-emerges to form a rim traversing arc 12, shown in end view, which at a point 14 becomes a chime engaging arc 15 terminating at a point 16 adapted to rest beneath the chime edge 17. The groove traversing arc 11 is not shown in Fig. 4 by dotted lines since it is obscured by the chime engaging arc 15. Thus, it will be observed that in one embodiment of this invention the radii of the arcs 11 and 15 may be identical. As will be explained hereinafter, with reference to Fig. 8, it is preferred that the radius of the arc 15 be about ½ of the radius of the arc 11.

Figure 5:
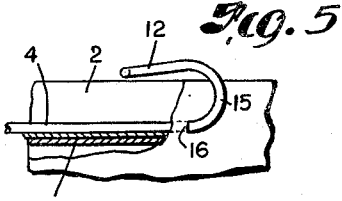
Fig. 5 is a cut-away fragmentary view of a top portion of an ordinary paint can showing the position of a free end of a clamping means of the bails of this invention when said bail is in the down position.

In Fig. 5 there is shown a fragmentary cut-away view of a top portion of a container of the "double tight" type showing a bail of this invention in the down position. A handle portion 4 is shown in contact with the bottom 18 of the groove bounded on one side by the lid 2. In this illustration, the rim traversing arc 12 now assumes a position nearly parallel to the plane of the lid 2. The chime engaging arc 15 has been revolved through an arc of 90°, and the free end 16, although not in contact with the underside of the chime, not shown, is retained on the container due to the inward pressure occasioned by the deviation of the plane of the arc 15 from the normal.

It should be noted that when the bail handle 4 is rotated from the vertical to the horizontal, the circumference of the groove engaging arc may remain in rolling and/or sliding contact with the bottom of the groove 3.

Figure 6:
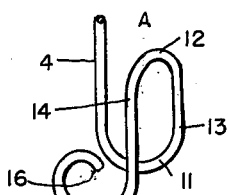
Fig. 6 is an isometric view of a clamping means in accordance with this invention.
Figure 7:
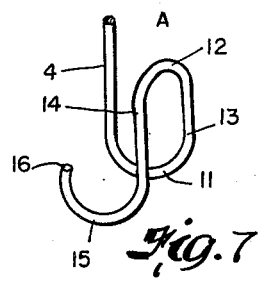
Fig. 7 is also a view of another form of clamping means in accordance with this invention.
Figure 8:
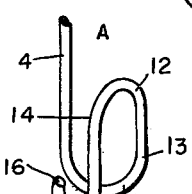
Fig. 8 is a view of a preferred form of clamping means in accordance with this invention.

Figs. 6, 7 and 8 are isometric views of clamping means in accordance with this invention. The continuation of the handle portion 4 is bent to form the groove engaging arc 11 which at about the point 13 becomes a rim traversing arc 12, which in turn at about the point 14 becomes a chime engaging arc 15.

In Fig. 6, there is shown a slight modification of the chime engaging arc 15 wherein the free end 16 is bent through a helix to rest on the center line of the arc 11 and a portion of the arc 15.

In Fig. 7 the free end 16 is in an arc of the same radius as the groove engaging arc 11.

Fig. 8 shows a preferred form of clamping means A wherein the chime engaging arc 15 has a radius equivalent to about ½ of the radius of the groove engaging arc 11. The free end 16 in this embodiment (Fig. 8) is located on the center line of the groove engaging arc 11. It will be noted that in the embodiment shown in Fig. 8, when the bail handle is rotated through the arc from the vertical to the horizontal, the free end 16 will remain at one point on the side of the can and will not scrape or slide therealong, as will occur in the embodiment shown in Fig. 7 and more clearly illustrated in Fig. 5.

In the manufacture of detachable wire bails in accordance with this invention, the shape of the handle portion 4 may be any shape desired. It is convenient, however, to provide a handle portion 4 having a radius equivalent to the distance from the center of the lid 2 to the center of the groove 3. Thus, when the bail is in the down position, the handle portion 4 will rest within the groove 3. Such modification permits more satisfactory packaging of one or more containers. It is also contemplated that the handle portion may join the clamping means A as a straight or shaped wire in contact with the lid throughout part or all of the distance between the clamping means. In such manner a lid retaining clamp may be made.

In general, the clamping ends project laterally in the same directions from the ends of the bail and are identically shaped mirror images of each other. The centers of the three essential arcs may lie in the same horizontal plane when the handle is in a position as shown in Fig. 3. For manufacturing ease, however, and also for purposes of permitting the handle to describe an arc that is convenient, these centers are disposed on at least two and preferably three horizontal planes. The modification of these centers is best made with reference to the preferred distances in a vertical direction which have been found most suitable in practical application. The vertical distances between the lowest part of the groove engaging arc 11 to the underside of the wire from the topmost portion of the rim traversing arc is desirably high enough to permit the handle to go at least about 10° past the vertical in the raised portion. The vertical distance from the lowermost portion of the chime engaging arc to the underside of the wire forming the topmost portion of the rim traversing arc is determined by the limitations of the machine used in bending the wire. In general, this distance is somewhat more than the vertical distance which determines the path described by the bail handle portion. Under these circumstances, it will be seen that the chime engaging arc 15 may necessarily be provided with a straight portion near the free end 16 to position the free end on the center line of the groove engaging arc. It has been found that a minimum length straight section thus described is required when the bails are machine bent.

The diameter of the rim traversing arc is slightly more than the distance from the outside of the chime or can bead to the groove, i. e., sufficient to provide free movement of the clamp back and forth in its normal position.

The radius of the groove engaging arc is limited by the vertical distance from the lower edge of the chime to the bottom of the groove. It may be any length shorter than this distance. The radius of the chime engaging arc desirably ranges from a radius about equal to that of the groove engaging arc to the radius equal to about ½ of the radius of the groove engaging arc. These arcs are generally semi-circular in shape, although to permit the bail handle portion to pass through an arc greater than 90°, i. e., 100°, the arc of the groove engaging member is desirably somewhat more than 180°. This is indicated in Figs. 2 and 5.

It should be pointed out that while it is convenient to bend the wire in arcuate form, certain of the described arcs need not be circular in shape. For example, the rim traversing arc may be rectangular in shape since an arcuate shape here serves no function other than to carry the free end of the bail handle from the groove to its position beneath the chime. The groove engaging arc is desirably circular in shape to permit a sliding or rolling pivot facilitating raising and lowering the bail handle. The chime engaging arc also need not be arcuate in shape since the purpose of this position of the wire is to carry the free end upwardly to position it in an upward and inward direction bearing beneath the chime edge.

It will be seen, therefore, that there has been provided, as a preferred form, a detachable wire bail for containers of the "multiple friction lid" type which bail comprises a handle portion terminating in two clamps projecting laterally in the same direction from the ends of the bail, which clamps are identically shaped mirror images of each other, each comprising a groove engaging arc, a rim traversing arc, and a chime engaging arc, each of said arcs lying in a plane substantially at right angles to the plane of the next succeeding arc, the free ends of said detachable bail being adapted to engage the can body under the chime and be frictionally retained thereby.

The bails of this invention are attached to the can or container by aligning the groove engaging member with the groove in the lid or the rim, as the case may be, and forcing the free end of the chime engaging arc downwardly over the chime to snap thereunder. The bail may be removed by prying a free end of the bail out from under the chime with a suitable instrument, and then springing the remaining side from its position using the bail handle as a lever.

The individual clamps in combination with a bail handle portion are believed to be novel and useful and it is accordingly contemplated that such individual clamps may be used on one end of said handle and an equivalent, though differently shaped clamp employed on the remaining end.

It should be emphasized that it has been convenient as an aid to visualizing the structures contemplated to refer to the planes of the arcs or loops as being "substantially at right angles to the plane of the next succeeding loop." It is not contemplated that this language be limiting to 90° relationships. Certain of these planes may vary from the normal from by 1° to about 10° and one such plane may vary up to about 45° from the normal. The above quoted phrase is to be construed as generic to the ranges described with reference to the individual planes of the loops where it appears herein and in the appended claims. The planes of these arcs are also referred to herein and in the appended claims as lying in "substantially vertical planes." It is believed obvious that such nomenclature is again for convenience relating to an intrinsic datum plane or line. Thus the term "vertical" is used in a relative sense rather than as descriptive of a position in space with reference to an extrinsic datum plane or line. The term "substantially" again contemplates deviations of the magnitude mentioned above. For example, as indicated previously, the plane of the rim traversing loop may be tipped from the vertical from about 1 to about 10° in the direction toward or away from the plane of the handle portion in order to permit a larger or smaller arc to be described by the handle as it moves from the down position within the recess to the up or normal carrying position. Some latitude of motion of the bail when in the normal carrying position is desirable to impart a comfortable "swing" to the container instead of an undesirable rigidity which occurs when the top of the rim traversing loop comes in contact with the rim.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A clamping means for securing formed wire articles to a friction-retained lid type container wherein the lid is provided with an annular recessed portion, which clamping means comprises a recess engaging member, a rim traversing member and a chime engaging member formed from a continuous wire, each of said members constituting a loop of wire lying in a substantially vertical plane substantially at right angles to the plane of the next succeeding wire loop, and having a free end adapted to engage the chime of a friction-retained lid container, the depth of the recess engaging member being limited by the depth of the recess in the lid of said container, the width of the rim traversing member being no less than the width of the rim, the width of the chime engaging member ranging from about the width of the recess engaging member to about ½ the width of the recess engaging member, and having the free end of said chime engaging member of sufficient length to be positioned directly under the chime when the recess engaging member is in contact with the bottom of the recess in said container lid and, from the combined effect with the recess engaging member, in frictional engagement with the container body.

2. A clamping means for securing formed wire articles to a multiple friction lid type container wherein the lid is provided with an annular groove, which clamping means comprises a groove engaging member, a rim traversing member and a chime engaging member formed from a continuous wire, each of said members constituting a loop of wire lying in a substantially vertical plane substantially at right angles to the plane of the next succeeding wire loop, and having a free end adapted to engage the chime of a multiple friction lid container, the depth of the groove engaging member being limited by the depth of the groove in the lid of said container, the width of the rim traversing member being no less than the width of the rim, the width of the chime engaging member ranging from about the width of the groove engaging member to about ½ the width of the groove engaging member, and having the free end of said chime engaging member of sufficient length to be positioned directly under the chime when the groove engaging member is in position within the groove in said container lid and, from the combined effect with the groove engaging member in frictional engagement with the container body.

3. A clamping means in accordance with claim 1 in which the recess engaging member is substantially semi-circular in shape having a diameter substantially equivalent to the depth of the recess.

4. A clamping means in accordance with claim 1 in which the chime engaging member is helical in shape, and has a maximum width ranging from about the width of the recess engaging member to about ½ the width of the recess engaging member.

5. A clamping means in accordance with claim 1 in which the free end of the chime engaging member is positioned on the center line of the recess engaging member.

6. A clamping means for securing formed wire articles to a friction-retained lid type container wherein the lid is provided with an annular recessed portion, which clamping means comprises a recess engaging member, a rim traversing member and a chime engaging member formed from a continuous wire, each of said members constituting a loop of wire lying in a substantially vertical plane, the plane of the rim traversing member being at right angles to the plane of the recess engaging member, and the plane of the chime engaging member being less than a right angle and more than about 45° with respect to the plane of said rim traversing member, said chime engaging member having a free end adapted to engage the chime of a friction retained lid container, the depth of the recess engaging member being limited by the depth of the recess in the lid of said container, the width of the rim traversing member being no less than the width of the rim, the width of the chime engaging member ranging from about the width of the recess engaging member to about ½ the width of the recess engaging member, and having the free end of said chime engaging member of sufficient length to be positioned directly under the chime when the recess engaging member is in position within the recess in said container lid and, from the combined effect with said recess engaging member, in frictional engagement with the container body.

7. A clamping means in accordance with claim 6 in which the height of the rim traversing member is more than the depth of the recess.

8. A clamping means in accordance with claim 6 in which the height of the rim traversing member is more than the depth of the recess in the lid and the plane of the rim traversing member is tipped slightly from the vertical within the range of from 1 to 10° toward the free end of the chime engaging loop.

9. A detachable wire bail for containers of the friction retained lid type which bail comprises a handle portion terminating in two clamps projecting laterally in the same direction from the ends of said handle portion, which clamps are identically shaped mirror images of each other, each of said clamps comprising a groove engaging loop, a rim traversing loop and a chime engaging loop, each of said loops lying in a substantially vertical plane substantially at right angles to the plane of the next succeeding loop, the free ends of said detachable bail being adapted to engage the can body under the chime and be frictionally retained thereby.

10. A detachable wire bail for containers of the friction retained lid type which bail comprises a handle portion terminating at each end in clamping means as described in claim 1.

11. A detachable wire bail for containers of the friction retained lid type which bail comprises a handle portion and a clamping means, which clamping means comprises a recess engaging member, a rim traversing member and a chime engaging member formed from a continuous wire, each of said members constituting a loop of wire lying in a substantially vertical plane, the plane of the rim traversing member being at right angles to the plane of the recess engaging member and the plane of the chime engaging member being less than a right angle and more than about 45° with respect to the plane of said rim traversing member, said chime engaging member having a free end adapted to engage the chime of a friction retained lid container, the depth of the recess engaging member being limited by the depth of the recess in the lid of said container, the width of the rim traversing member being no less than the width of the rim, the width of the chime engaging member ranging from about the width of the recess engaging member to about ½ the width of the recess engaging member, and having the free end of said chime engaging member of sufficient length to be positioned directly under the chime when the recess engaging member is in position within the recess engaging member, in frictional engagement with the container body.

12. A detachable wire bail for containers of the friction retained lid type, which bail comprises a handle portion terminating in two clamps projecting laterally and in the same direction from the ends of said handle portion, which clamps are identically shaped mirror images of each other, each of said clamps comprising a recess engaging member, a rim traversing member, and a chime engaging member, said bail being formed from a continuous wire, each of said members constituting a loop of wire lying in a substantially vertical plane, the plane of the rim traversing member being at right angles to the plane of the recess engaging member, and the plane of the chime engaging member being less than a right angle and more than about 45° with respect to the plane of the rim traversing member, said chime engaging member having the free end adapted to engage the chime of a friction retained lid container, the depth of the recess engaging member being limited by the depth of the recess in the lid of said container, the width of the rim traversing member being no less than the width of the rim, the width of the chime engaging member being equivalent to about ½ the width of the recess engaging member, and having the free end of said chime engaging member of sufficient length to be positioned on the center line of the loop of the recess engaging member and directly under the chime when the recess engaging member is in position within the recess in said container lid and, from the combined effect with said recess engaging member in frictional engagement with the container body.

CARL F. SPRAGUE.

References Cited in the file of this patent

UNITED STATES PATENTS

| Number | Name | Date |
|---|---|---|
| 1,575,232 | Shearer | Mar. 2, 1926 |
| 1,599,525 | Hanson | Sept. 14, 1926 |
| 1,693,896 | Hanson | Dec. 4, 1928 |